United States Patent
Marston et al.

[11] Patent Number: 6,167,097
[45] Date of Patent: Dec. 26, 2000

[54] FREQUENCY GENERATING CIRCUIT

[75] Inventors: Paul S. Marston, Cambridge, United Kingdom; Evert D. Van Veldhuizen, Veldhoven, Netherlands

[73] Assignee: U.S. Philips Corporation, New York, N.Y.

[21] Appl. No.: 08/862,210

[22] Filed: May 22, 1997

[30] Foreign Application Priority Data

May 23, 1996 [GB] United Kingdom .................. 9610801

[51] Int. Cl.[7] .................................................. H04L 27/06
[52] U.S. Cl. ...................... 375/316; 331/172; 331/177 R
[58] Field of Search .................................... 375/316, 324, 375/327, 340; 331/172, 177 R

[56] References Cited

U.S. PATENT DOCUMENTS

| | | | |
|---|---|---|---|
| 4,280,099 | 7/1981 | Rattlingourd | 375/373 |
| 5,052,026 | 9/1991 | Walley | 375/119 |
| 5,398,007 | 3/1995 | Yamazaki et al. | 331/46 |
| 5,793,819 | 8/1998 | Kawabata | 375/326 |

FOREIGN PATENT DOCUMENTS

| | | | |
|---|---|---|---|
| 4403124A1 | 8/1995 | Germany | G04G 7/02 |

*Primary Examiner*—Temesghen Ghebretinsae
*Attorney, Agent, or Firm*—Jack D. Slobod

[57] ABSTRACT

A receiving apparatus has a clock frequency generating circuit comprising in a first embodiment a low cost oscillator whose frequency is higher than the wanted clock frequency and in a second embodiment a low cost oscillator whose frequency can be higher or lower than the wanted clock frequency. By means of subtracting pulses from (first embodiment) or adding/subtracting pulses (second embodiment) to/from the output of the low cost oscillator, a clock frequency is generated which is stable within a specified tolerance range. More particularly, the receiving apparatus comprises a circuit (10,12) for receiving a transmitted signal, a circuit (14, 16) for deriving a repetitive reference signal from the received transmitted signal, clock signal generating circuit (22, 24, 32) for generating a clock signal having a frequency corresponding substantially to a desired frequency, and a circuit (36, 42, 46) for determining whether the clock frequency generated in respective time periods between successive reference signals varies relative to an arbitrarily set value, the circuit providing a control signal which is used to adjust the frequency of the generated clock signal.

9 Claims, 4 Drawing Sheets

FREQUENCY GENERATING CIRCUIT

BACKGROUND OF THE INVENTION

The present invention relates to a frequency generating circuit and to a receiving apparatus comprising such a frequency generating circuit. An example of the receiving apparatus is a digital paging receiver.

In the present specification the term "receiving apparatus" is to be understood to cover at least the receiving section of a transceiver apparatus which may comprise an answer back paging apparatus or a cordless and/or cellular telephone.

Many different types of frequency generating circuits are known in the art. For example temperature controlled crystal oscillators are known and normally require a high tolerance crystal to provide frequency stability. The more accurately a crystal is cut the greater its cost. It is known to place crystals in temperature controlled ovens in order to stabilise their frequencies. Drawbacks to using an oven in radio apparatus, especially a portable radio apparatus, are space and power consumption consideration.

DE 44 03 1241 A1 discloses a radio clock circuit in which dedicated radio timing signals are used to synchronise a quartz oscillator in clock circuit.

Frequency synthesiser circuits are also well known and generally require a highly stable reference oscillator from which the desired frequency is obtained by a division operation.

OBJECTS AND SUMMARY OF THE INVENTION

An object of the present invention is to provide an acceptably accurate frequency generating means which makes use of a low-cost crystal oscillator.

According to one aspect of the present invention there is provided a frequency generating circuit comprising means for deriving a repetitive reference signal produced by a source external to the frequency generating circuit, means for generating a clock signal having a frequency corresponding substantially to a desired frequency, and means for determining whether the clock frequency generated in respective time periods between successive reference signals varies relative to an arbitrarily set value, said means providing a control signal which is used to adjust the frequency of the generated clock signal.

According to another aspect of the present invention there is provided a receiving apparatus comprising means for receiving a transmitted signal, means for deriving a repetitive reference signal from the received transmitted signal, clock signal generating means for generating a clock signal having a frequency corresponding substantially to a desired frequency, means for determining whether the clock frequency generated in respective time periods between successive reference signals varies relative to an arbitrarily set value, said means providing a control signal which is used to adjust the frequency of the generated clock signal.

The present invention is based on the realisation that the signal timing in applications, such as cellular and cordless telephones and digital paging, is frequently accurate to five parts per million (ppm) and can be used as a reference. Since the time period between successive synchronisation code words is substantially constant then for all practical purposes the durations of successive time periods is substantially constant and are independent of the propagation time from the transmitting antenna and in consequence the accuracy is maintained irrespective of the distance from the transmitting antenna.

BRIEF DESCRIPTION OF THE DRAWINGS

The present invention will now be described, by way of example, with reference to the accompanying drawings, in which.

In the drawings the same reference numerals have been used to indicate corresponding features.

DETAILED DESCRIPTION OF THE PREFERRED EMBODIMENT

Figure 1:
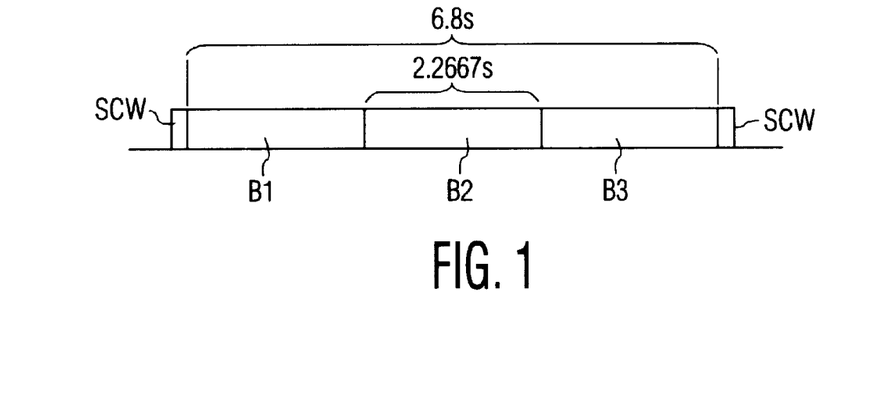
FIG. 1 is a timing diagram showing the occurrence of successive synchronisation code words in a received paging signal.

Referring to FIG. 1 the diagram illustrates the occurrence of synchronisation code words SCW occurring at accurately timed intervals of a paging system having a synchronised signalling protocol. In the illustrated embodiment the protocol comprises a cycle having a duration of 6.8 seconds. Each cycle is divided into 3 batches B1, B2, B3, each having a duration of 2.2667 s. Each batch comprises a plurality of frames (not shown) containing code words which may be address/data code words. The decoder provided in the paging receiver has means for producing timing pulses at the occurrence of the end of each of the synchronisation code words.

Figure 2:
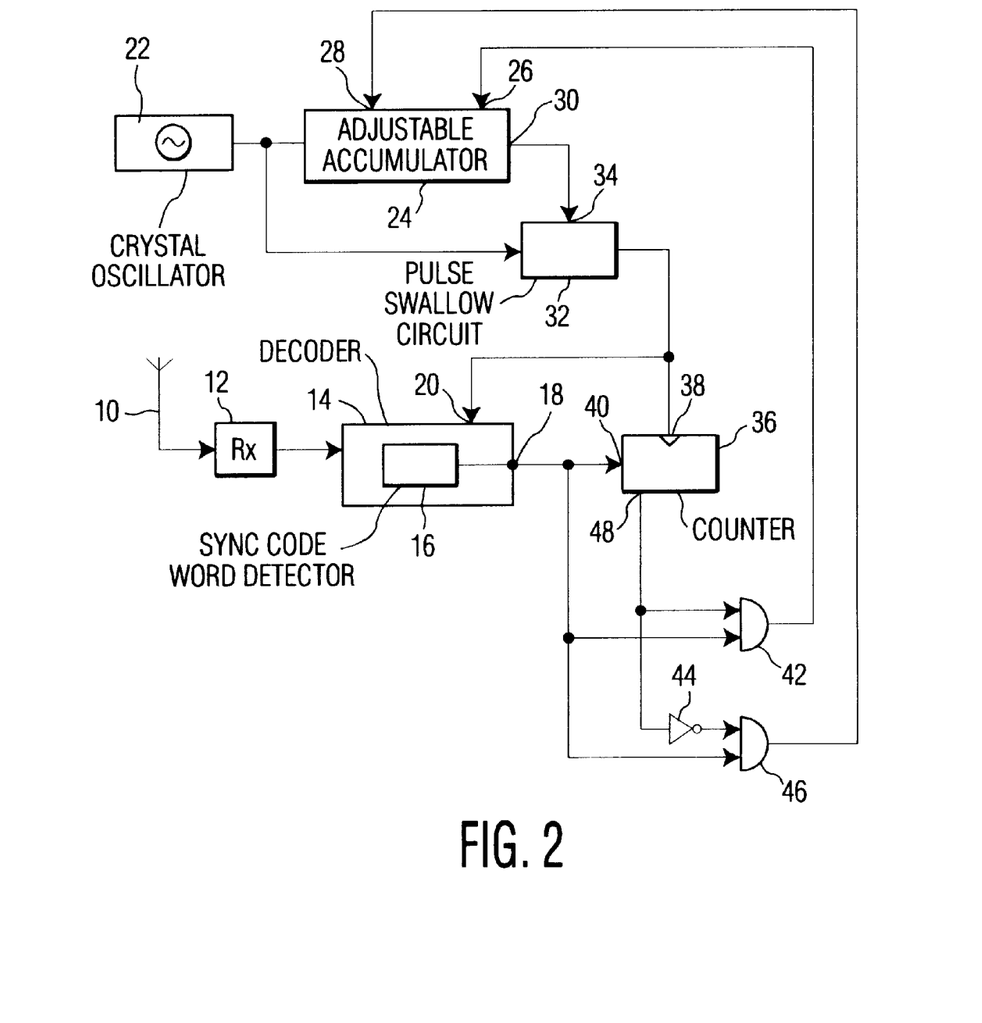
FIG. 2 is a block schematic diagram of one embodiment of the present invention.

In FIG. 2 an input signal received by an antenna 10 is applied to a receiver stage 12. The demodulated signal from the receiver stage 12 is applied to a decoder 14 which includes synchronisation (sync) code word detector 16. The detector 16 has means for providing an indication that a sync code word has been detected on an output 18. The indication that a sync code word has been detected is generated at the end of a synchronisation code word which is a more accurate time reference than the start. The decoder 14 has an input 20 for a clock signal provided by a frequency generating circuit.

The frequency generating circuit comprises a low-cost crystal oscillator 22 having a high tolerance crystal say up to 200 parts per million. The nominal output frequency of the crystal oscillator is greater than that of the clock signal to be supplied to the clock input 20 of the decoder 14. An output of the crystal oscillator 22 is applied firstly to an adjustable accumulator which in the illustrated embodiment comprises a counter 24 having inputs 26, 28 to which are applied signals for adjusting the modulus of the counter down or up, respectively. The counter 24 has an overflow output 30. The counter 24 operates on the basis that when the count in the counter equals the current modulus value then an overflow pulse is provided on the output 30.

A pulse swallow circuit 32 which may be of a type described with reference to FIGS. 1 and 2 of British Patent Specification GB-A-2062315 has an input connected to receive the output from the crystal oscillator 22 and a subtract input 34 connected to the output 30 of the counter 24. In the operation of the pulse swallow circuit 32, at the occurrence of an overflow pulse on the input 34, a cycle of the crystal oscillator frequency is "swallowed" or eliminated. The net effect of this is to reduce the nominal frequency from the crystal oscillator 22 to a value approaching that of the clock frequency required for the decoder 14.

In order to control the frequency of the clock signal a measurement counter 36 is provided having an input 38 for the clock signal derived from the pulse swallow circuit 32. The counter 36 has a reset input 40 connected to the output 18 of the sync code word detector 16. Once the counter 36 has been reset it accumulates the clock frequency signal for a period of time until a reset signal is applied to the input 40. The modulus of the counter 36 is such that it cycles an integer number of times between successive reference pulses if the corrected oscillator frequency is at the desired frequency. However if, at the occurrence of the sync code word, the clock frequency is high then the most significant bit of the counter is "0" (because it has passed zero due to overflowing) and if it is low then the most significant bit is "1" (because it has yet to reach its maximum value).

Two AND gates 42, 46 are provided. The inputs of the AND gate 42 are connected to the output 18 of the sync code word detector 16 and to an output 48 of the counter 36, which output has the most significant bit (msb). The output 18 is connected to one input of the AND gate 46. An inverter 44 is connected to a second input of the AND gate 46, the input of the inverter being connected to the output 48 of the counter 36. The AND gate 42 is connected to the up input 26 of the counter 24 and the output of the AND gate 46 is connected to the down input 28 of the counter 24.

In operation of the frequency generating circuit, cycles of the crystal oscillator frequency are swallowed as described earlier and the resulting clock frequency is applied to the clock input 20 of the decoder 14 and to the input 38 of the counter 36. If between successive reset pulses applied to the input 40, the clock frequency is sufficiently high that the most significant bit on the output 48 is "0" then the output of the AND gate 46 is high and a signal is applied to the down input 28 of the counter 24. The effect of this is to reduce the modulus by one so that more crystal oscillator cycles are swallowed thereby reducing the resulting clock frequency. Conversely if the most significant bit output 48 is "1", indicating that the frequency is low then an output is provided by the AND gate 42 to the up input 26 of the counter 24 which increases its modulus so that less pulses are swallowed causing the resulting clock frequency to be increased.

The circuit illustrated and described is particularly suited to using crystals which are cut to have a standard tolerance band of ±100 ppm (parts per million). However other tolerances also have to be accommodated when implementing the circuit. Some typical tolerances are summarised below:

| Crystal Cutting | ±100 ppm |
| Temperature | −67 ppm |
| Ageing (5 years) | ±7 ppm |
| Oscillator Component and Strays | ±8 ppm |
| Transmitted Bit Rate | ±5 ppm |

Total of Tolerances +120 to −187 ppm, or a range of 307 ppm.

If by way of example, a desired frequency of 76800 Hz is required, the nominal crystal frequency must be at least 187 ppm above 76800 Hz. As the uncorrected oscillator frequency approaches the required frequency, the number, n, of oscillator cycles between excitation of the pulse swallow circuit 32 becomes very large. Therefore the modulus number n should be limited to reduce the size of the counter 24, that is $$n = \frac{f_{OSC}}{f_{OSC} - f_{MAIN}}$$

where $f_{OSC}$ is the uncorrected oscillator frequency and $F_{MAIN}$ is the required main clock frequency (76800 Hz).

The resolution, r, of the counter 24 at a given value is given by:

$$r = \left(\frac{1}{n} - \frac{1}{n+1}\right) \times 10^6 \approx \frac{10^6}{n^2} \text{ppm}$$

A resolution of one clock period in relation to one batch (B1, B2 or B3) is:

$$\frac{10^6}{76800 \times 2.2667} \text{ppm} = 5.7 \text{ ppm}$$

Assuming that the resolution of the counter should approximate to that given by one half of one clock period over the period, 2.2667 s, of a batch, that is r=2.85 ppm, then n≈$(10^6/r)^{1/2}$=592.

If n=592 is the minimum value of n and corresponds to the highest oscillator frequency of $F_{CRYSTAL}$+120 ppm; then the minimum, typical and maximum values of n can be tabulated as follows:

|  | $n_{MIN}$ | $n_{TYP}$ | $n_{MAX}$ |
|---|---|---|---|
| n | 592 | 637 | 731 |
| r(ppm) | 2.85 | 2.46 | 1.87 |
| $F_{OSC}$ (HZ) | 76930 | 76920 | 76905 |

Therefore, the actual nominal crystal frequency is that of $f_{OSC}$ when n is at its typical value.

$f_{CRYSTAL}$=76920 Hz which is the standard frequency of 76800 Hz+1570 ppm.

Using the time of a cycle given in FIG. 1, that is 6.8 seconds, the exact number of clock cycles at 76800 Hz is 522240.

The modulus of the counter 36 only needs to be large enough to allow for the maximum expected clock deviation. Once the compensation circuit has been set to overcome the fixed tolerances due for example to crystal cutting, the variable tolerances which may occur are never greater than 67+7+5=79 ppm. In reality if such an offset should occur and remain uncompensated during operation, data appearing towards the end of a batch will never be recovered.

It will be noted that 522240 is 255×$2^{11}$, so that an 11 bit counter would cycle 255 times in a 6.8 s period. ±79 ppm equates to ±41 clocks in 522240. This is the largest value the counter 24 of clock cycles can be different from the expected number in one 6.8 s period. Therefore a 7 bit counter of modulus ±64 would comfortably accommodate the total oscillator offset range. Preferably the modulus of the counter should be sufficiently large so that an error having a magnitude of the order of one modulus value is unlikely because otherwise there is a risk that a correction in the wrong direction will be made. If the msb on the output 48 is 0, then the sync code word is detected late relative to the previous one, therefore the compensated clock is running fast relative to the transmitted data. In such a case, the modulus of the counter 24 is decremented (such that n≦n−1) which leads to more clock periods being swallowed per 6.8 s period. Consequently the internal clock rate will decrease by between 2 and 3 ppm.

Conversely, if the msb is 1, the value n is incremented to increase the internal clock rate.

Under conditions of continuous data reception at a low noise level, the internal clock will be maintained within 6 ppm of the received data rate. Temperature changes of over 3 ppm per 6.8 s period will be accurately tracked.

When data is not available to the decoder 14 due for example to an intentional break in the transmissions, a fade or assuming a carrier lost mode, the compensation value will remain constant since no sync code words are detected.

Figure 3:
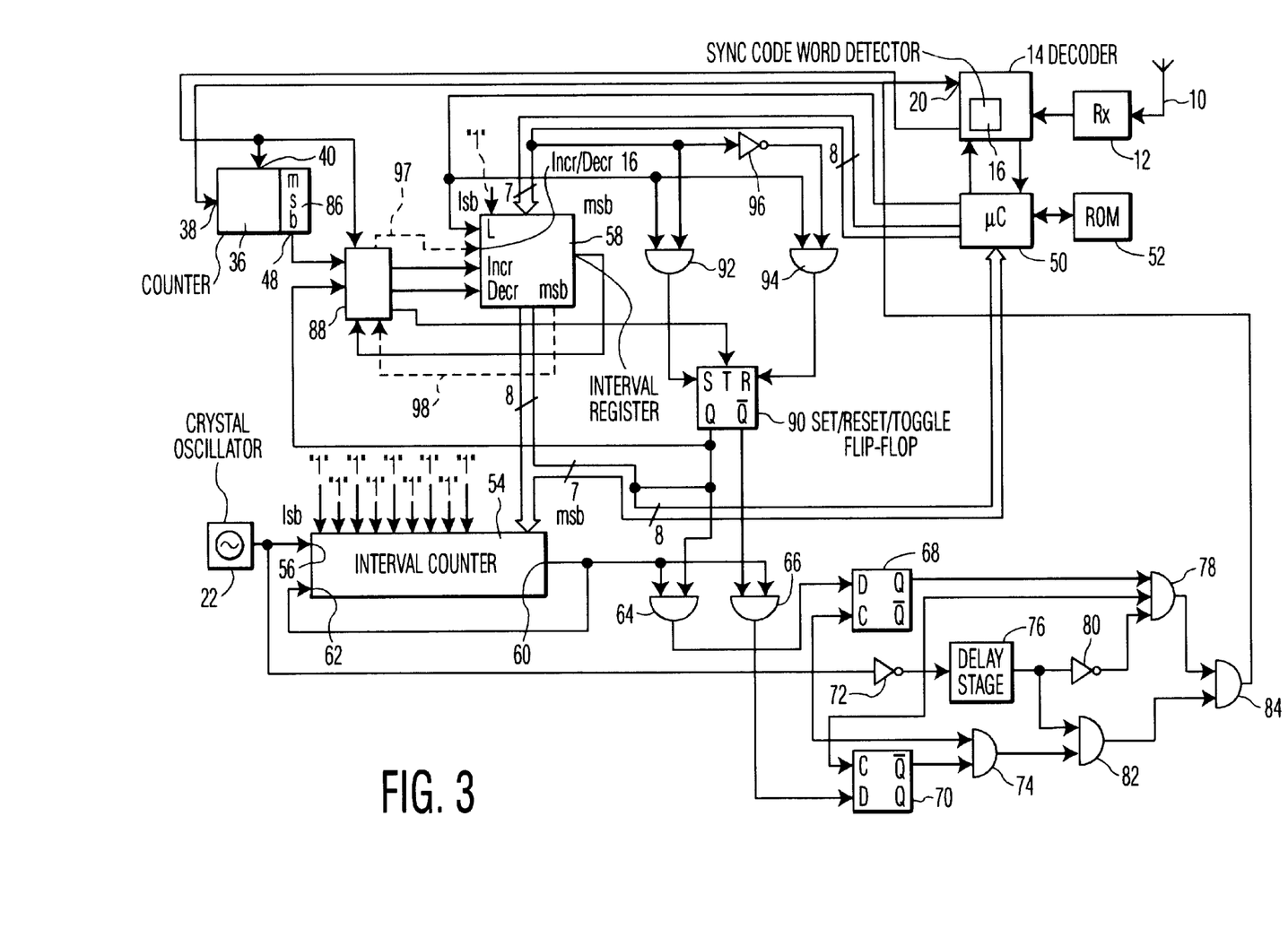
FIG. 3 is a block schematic diagram of a second embodiment of the present invention, FIG. 4 comprises waveform diagrams of uncorrected and corrected clock pulse waveforms.

FIG. 3 discloses an embodiment of the present invention which is able to correct the frequency if the uncorrected oscillator frequency varies to the extent that it can be lower as well as higher than the corrected clock frequency. In the event of the frequency being lower, pulses have to be added.

The illustrated receiving apparatus comprises a receiving section 12 having an antenna 10. The receiving section 12 provides data signals which are decoded in a decoder 14 which includes a sync code word detector 16. A microcontroller 50 is coupled to the decoder 14 and is operated in accordance with program software stored in a read-only memory 52. The decoder 14 has a clock input 20 for a corrected clock signal derived from a clock frequency generating circuit to be described below.

The clock signal generating circuit comprises a low cost crystal oscillator 22 which generates an output frequency which varies relative to the corrected clock frequency, for example 76.8 kHz, which is supplied to the input 20 of the decoder. The uncorrected clock signal is supplied to a clock input 56 of an interval counter 54 which in the illustrated embodiment is a 16 stage free running down—counter. The most significant 7 bits loaded into the counter 54 are derived from an output of an interval register 58 to be described later and the least significant 9 bits comprise binary "1"s which are reloaded. An all "0's" output 60 of the counter 54 is coupled to a load input 62 of the counter 54 and to inputs of 2 input AND gates 64, 66, respectively. The AND gates 64, 66 respectively provide "add" and "delete" signals which are applied to D inputs of D-type flip-flop 68, 70. The uncorrected clock signal is applied to the clock input C of the flip-flop 68, to an inverter 72 and to one input of a 2-input AND gate 74, a second input of which is derived from the $\overline{Q}$ output of the flip-flop 70. An output of the inverter 72 is applied to the clock input C of the flip-flop 70, to a delay stage 76 and to one input of a 3 input AND gate 78. A Q output of the flip-flop 68 is coupled to a second input of the AND gate 78. An output of the delay stage 76, which typically has a time delay of the order of a quarter of a corrected clock period, is coupled to an inverter 80 and to one input of a 2 input AND gate 82, a second input of which is derived from an output of the AND gate 74. An output of the inverter 80 is coupled to a third input of the AND gate 78. Outputs of the AND gates 78, 82 are respectively connected to inputs of an OR gate 84 from the output of which is derived the corrected clock frequency.

The delay stage 76 is provided to allow the addition of a pulse to the corrected clock frequency. However in a non-illustrated embodiment of the present invention the corrected clock is derived from the clock 22 whose output is divided by 2. An additive correction is made by allowing an extra clock pulse through to the corrected clock output, thereby avoiding the need for the delay stage 76.

The corrected clock signal is provided to an input 20 of the decoder and to a clock input 38 of a measurement counter 36 which has a reset input 40 to which is connected an output of the sync code word detector 16. The counter 36 has an output 48 from its msb stage 86. A logic stage 88 is provided which has inputs for the output of the sync code word detector 16, from the output 48 of the msb stage 86, for an all "1"s output of the interval register 58 and from a Q output of a set/reset/toggle flip-flop 90. The 7 bit interval register 58 is loaded by the microcontroller 50.

The logic stage 88 provides increment and decrement outputs which are coupled to corresponding inputs Incr and Decr of the interval register 58 and a toggle output which is connected to the toggle input T of the flip-flop 90.

The microcontroller 50 provides a load signal which is coupled to a load input L of the input register 58 and to inputs of 2 input AND gates 92, 94. The microcontroller 50 supplies an eighth bit in parallel with the 7 bits which are loaded into the interval register 58. This eighth bit is applied to the second input of the AND gate 92 and is applied to an inverter 96, the output of which is applied to the second input of the AND gate 94. The outputs of the AND gates 92, 94 are applied to the set S and reset R inputs, respectively, of the flip-flop 90. The Q and $\overline{Q}$ outputs of the flip-flop 90 are applied to the second inputs of the AND gates 64, 66 respectively.

The interval register 58 provides a 7 bit parallel output which is applied to the msb positions of the interval counter 54 and is supplied to the microcontroller 50.

The basic idea behind the operation of this embodiment is to compensate for the inaccuracy of the oscillator 22 by digitally adding or deleting a clock pulse at regular intervals. In order to determine whether a clock pulse should be added or deleted and whether the interval should be increased or decreased, the time between two received synchronisation words is measured. It is assumed that the transmitted bit rate is accurate to within ±5 ppm.

For this measurement the free running 7-bit up-counter 36 is clocked by the corrected clock signal applied to its input 38. This counter always has the same position after a number of clock pulses equal to any multiple of $2^7$.

At the occurrence of a sync code word on the input 40, the value of the most significant bit (msb) on the output 48 is noted and the counter 36 is reset.

When the msb is "0" this measurement counter 36 is deemed to be running too fast, so the interval between deleting a clock pulse must be decreased or the interval between adding a clock pulse must be increased. When the msb is "1" the measurement counter 36 is deemed to be running too slow, so the interval between deleting clock pulses must be increased or the interval between adding clock pulses must be decreased. Addition or deletion is determined by the flip-flop 90.

The interval is produced by the interval counter 54 that is clocked by the uncorrected clock signal derived from the oscillator 22. When this down-counter 54 reaches zero a clock pulse is added or deleted. It is reloaded with a value that determines the length of the next interval.

The interval value is given by the interval register 58, that can be incremented or decremented. Increase or decrease of the interval is determined by the msb of the measurement counter 36 as described above. If the interval register 58 has reached its maximum (contains all "1"'s) and the msb indicates than an increment should be made, incrementing does not take place, because there is no overflow, but instead the logic stage 88 produces an output which causes the flip-flop 90 to be toggled.

At system reset the interval register 58 and the flip-flop 90 are loaded by the microcontroller 50. The loading value can be derived from the deviation of the oscillator frequency established at production and stored in an EEPROM. Alternatively it can be all "1"s so that self-alignment will occur.

In order to add or delete a pulse, the uncorrected clock signal from the oscillator 22 is inverted in inverter 72 and delayed by the delay stage 76 and by means of the AND gates 74, 78 and 82 and inverter 80 pulses may be produced at the rising or at the falling edge of the square wave input. The nominal pulse duration should be ¼ period of the 76.8 kHz signal i.e. 3.25 μsec. However, the tolerance can be quite large, dependent on the duty cycle of the oscillator output.

Normally a clock pulse is produced at the rising edge of the square wave. When a pulse must be deleted the D-type flip-flop 70 is set at the falling edge of the square wave which inhibits the pulse at the next rising edge. When a pulse must be added the D type flip-flop 68 is set at the rising edge of the square wave and enables a pulse at the next falling edge. The operation of adding or deleting a pulse can be verified by the construction of a truth table.

Figure 4:
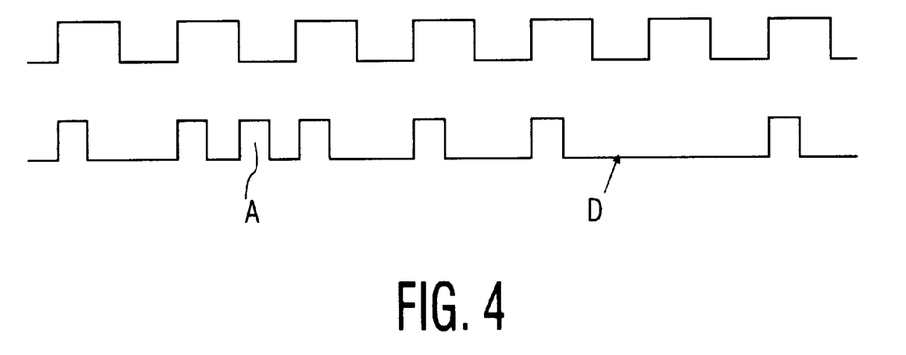

In FIG. 4 the upper diagram shows the uncorrected waveform produced by the oscillator 22 and the lower diagram the corrected clock signal in which a pulse has been added at A and deleted at D.

In order to determine whether the interval register 58 must be incremented or decremented the rate of the corrected clock pulses is measured by reference to the received sync words. The 7-bit measurement counter 36 runs on the corrected clock pulses. When a sync word has been received correctly the msb of the counter 36 is used together with the state of the flip-flop 90 to increment or decrement the interval register 58. At the same time the counter 36 is reset.

When the corrected clock frequency is slow the measurement counter 36 will not have reached the zero state when the next sync word arrives, so the msb will be "1". Conversely when the clock is fast the counter 36 value will be greater than zero and the msb will be "0". When the clock frequency is correct the counter 36 will be exactly zero, but this situation is taken as "fast", so the interval register 58 will always be incremented or decremented. The ratio between increments and decrements of the interval will cause the average clock speed to approximate the correct frequency of 76.8 kHz, depending on the accuracy of the transmitter.

The maximum frequency deviation that can be accommodated with a 7-bit measurement counter 36 can be calculated as follows:

The measurement counter 36 can hold values of ±64. When the corrected clock appears to be slower or faster than a difference of 64 pulses between successive sync words, it could seem that the clock is too slow when in fact it is too fast or vice versa.

The operation of the flip-flop 90, interval register 58 and interval counter 54 will now be described with reference to FIG. 5. At initialisation the microcontroller 50 provides an 8-bit value. The 7 least significant bits of the 8-bits are loaded into the interval register 58 and the most significant bit of the 8 bit value is applied to the AND gate 92 and the inverter 96. The interval register 58 is used to load the most significant 7 bits of the 16-bit interval counter 54. The least significant nine bits are loaded with "1"s. Loading is done when the interval counter 54 has counted down to zero (all "0"s). Then also a clock pulse is added or deleted, depending on the state of the flip-flop 90.

When a sync word is received, the interval register 58 is incremented or decremented depending on the msb of the measurement counter 36 and the state of the flip-flop 90. However, when the interval register 58 contains all "1"'s and according to msb and the flip-flop 90 the interval register should be incremented, incrementing does not take place, but instead the flip-flop 90 is toggled. The following table sets out the increment/decrement and toggle logic. The first 4 rows relate to normal operation when there is not an all "1"s output from the interval register 58 and the lower 4 rows relate to the situation when a 0/1 situation occurs in the interval register 58. This occurs, for example, at switch on or when the oscillator frequency is near the desired frequency.

| Inputs | | | Outputs | |
|---|---|---|---|---|
| msb of measurement counter 36 | Flip-Flop 90 (+ = add, − = delete) | All "1"s | Interval register 58 | Flip-flop 90 |
| 0 | − | 0 | decrement | no change |
| 1 | − | 0 | increment | no change |
| 0 | + | 0 | decrement | no change |
| 1 | + | 0 | increment | no change |
| 0 | − | 1 | decrement | no change |
| 1 | − | 1 | no change | toggle |
| 0 | + | 1 | no change | toggle |
| 1 | + | 1 | decrement | no change |

The contents of the interval register 58 and the flip-flop 90 can be read by the microcontroller 50, for example at the end of a transmission.

The relative increase or decrease of the correction in ppm when incrementing and decrementing the interval register 58 by 1 greatly depends on the absolute value of the interval register. The stabilisation time can be shortened by making the increase or decrease of the interval register 58 depend on the actual contents of the register. One method of implementing this is to increase or decrease by 16 instead of 1 when it is determined that the msb of the interval register 58 is "1" (value 64–127). Referring to FIG. 3, an Incr/Decr 16 line 97 (shown in broken lines) couples the logic stage 88 to an input of the interval register 58 and the msb stage of the register 58 is coupled by way of a line 58 (shown in broken lines) to an input of the logic stage 88.

This approach to shortening the stabilisation time has been found to be effective when having to track large temperature changes.

An embodiment will now be described of implementing the correction method partly in software which has the advantage of providing flexibility to adapt the measurement and correction interval to specific requirements or situations.

With software implementation the way of adding and deleting clock pulses can remain the same as shown in FIG. 3. The measurement counter is clocked by the corrected clock and is continuously running. It will be reset to 0 when the processor reads the msb. In this way the processor determines the measurement duration.

The state of the msb will determine whether the interval will be incremented or decremented.

Figure 5:
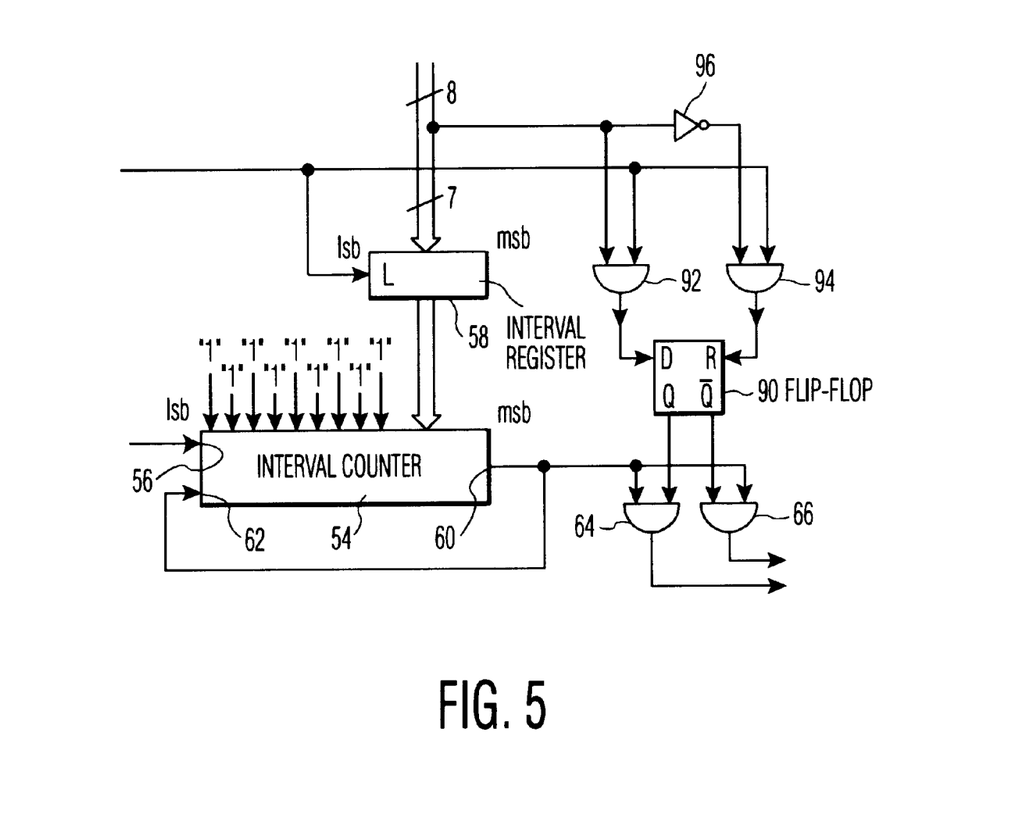
FIG. 5 is a block schematic diagram of the hardware parts of an embodiment of the present invention in which the other part comprises software.

FIG. 5 shows the arrangement of the flip-flop 90, the interval register 58 and the interval counter 54 for software control.

The software sets or resets the flip-flop 90 to determine whether pulses must be added or deleted and loads the interval register 58 with the number of clock pulses times 512. When the interval counter 54 reaches all "0"s a clock pulse is added or deleted and the counter 54 is reloaded with most significant 7 bits from the interval register 58 and the 9 least significant bits being all "1"s.

For convenience of description the software concept will be described with reference to clock correction in POCSAG in which sync code words occur every 480 ms when operating at 1200 baud. At every sync code word, an interrupt is given to the processor. Once every 3 interrupts the msb of the measurement counter 36 is read and the counter is reset. Then the interval register 58 and the flip-flop 90 are handled by the processor in the same way as is indicated in the table shown above for the hardware implementation, taking into account the following differences:

The state of the flip-flop 90 and the contents of the interval register 58 are present in an internal RAM location. The inputs referred to in the above-mentioned table are taken from this RAM location. "All "1"s" here means that the interval register 58 would overflow if an addition would take place. Finally, decrement and increment of the interval register are done by an amount that is dependent on the present contents of the interval register as shown in the following table:

| Present contents interval register | Amount by which the interval register is incremented or decremented | Correction step size (ppm) |
| --- | --- | --- |
| up to 15 | 1 | >2.81 |
| 16–31 | 2 | 3.7–5.62 |
| 32–47 | 3 | 2.5–5.5 |
| 48–63 | 5 | 2.35–4.15 |
| 64–95 | 9 | 1.9–4.2 |
| 95–127 | 19 | 2.28–3.00 |

The average correction achieved is at least 3 ppm per step.

Figure 6:
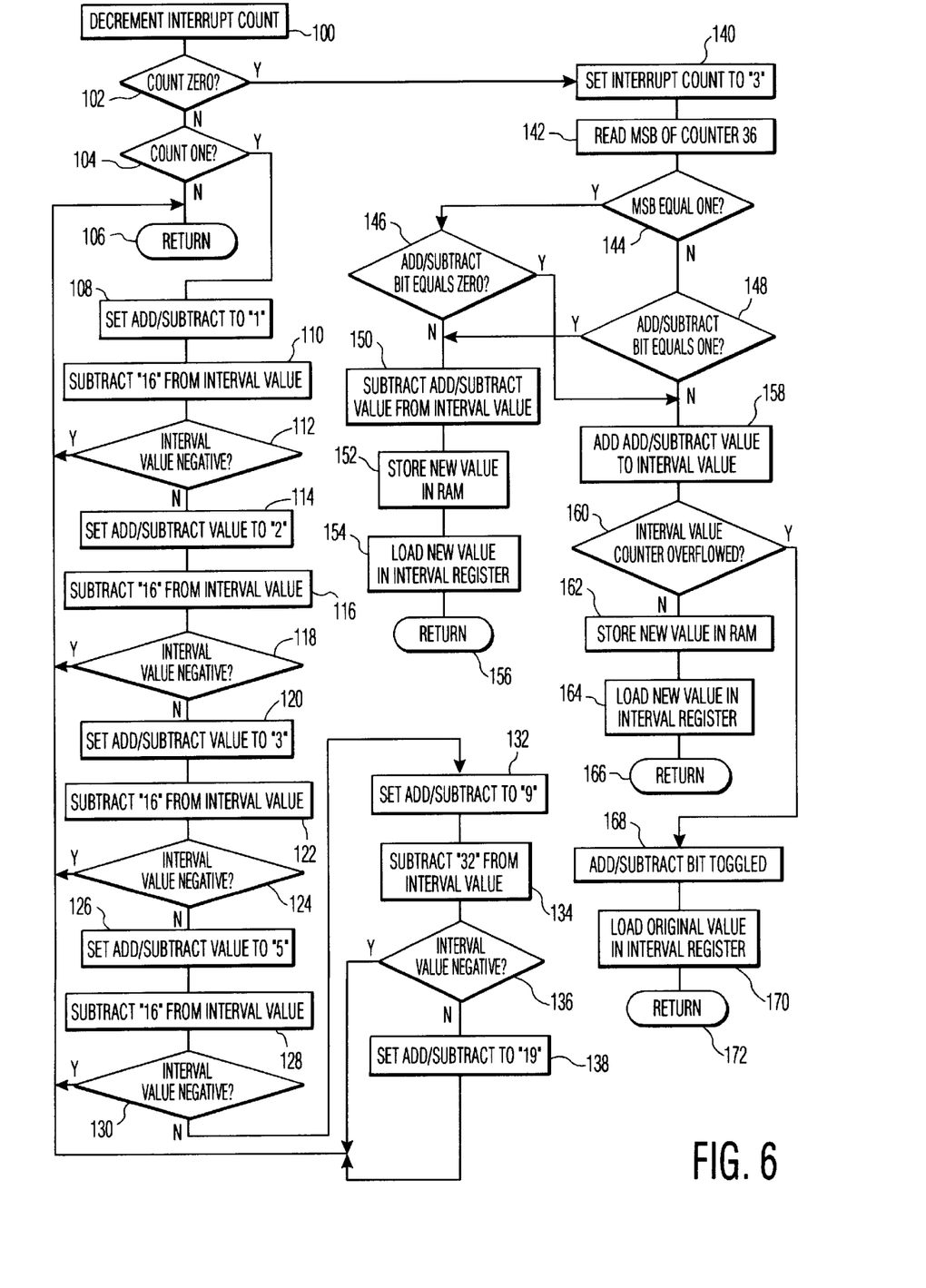
FIG. 6 is a flow chart of the operations associated with the embodiment shown in FIG. 5.

FIG. 6 is a flow chart of the clock correction part of the sync code word interrupt routine.

When the interrupt occurs the interrupt count is decremented. When the count is 1 the value is determined with which the interval register will be modified (according to the second of the above tables). When the interrupt count has reached 0 the interval register is updated. This occurs every 3 interrupts. Update of the interval register 58 is done according to the first of the above tables.

| RAM locations: | Interrupt count |
| --- | --- |
|  | Add/sub value |
|  | Interval value and +/−bit |
| Condition: | −Interrupt count" is 1–3. |

Referring more particularly to FIG. 6, block 100 relates to decrementing the interrupt count. In block 102 a check is made to see if the count is zero. If answer is N(No), then a check is made in block 104 if the count is "1". If it is not (N) then the flow chart proceeds to a return block 106. However, if the count does equal "1"(Y), then in block 108 the add/subtract value is set to "1". In block 110, "16" is subtracted from the interval value and in block 112 a check is made to see if the interval value is negative. If it is, (Y), the flow chart reverts to the return block 106. Alternatively, if it is not (N), then in block 114 the add/subtract value is set to "2". In block 116, "16" is subtracted from the interval value and in block 118 a check is made to see if the interval value is negative. If it is (Y), the flow chart reverts to the return block 106. Alternatively if it is not (N), then in block 120 the add/subtract value is set to "3" and in block 122 "16" is subtracted from the interval value. In block 124, a check is made to see if the interval value is negative. If it is (Y), the flow chart reverts to the return block 106. Alternatively, if it is not (N) then in block 126 the add/subtract value is set to "5". In block 128 "16" is subtracted from the interval value. In block 130, a check is made to see if the interval value is negative. If it is (Y), the flow chart reverts to the return block 106. Alternatively if it is not (N) then in block 132 the add/subtract value is set to "9". In block 134, "32" is subtracted from the interval value. In block 136, a check is made to see if the interval value is negative. If it is (Y), the flow chart reverts to the return block 106. Alternatively if it is not (N) then in block 138 the add/subtract value is set to "19" and the flow chart reverts to the return block 106.

Reverting to the block 102, if the count does equal zero, then in a block 140 the interrupt count is set to "3". In block 142 the msb of the measurement counter 36 (FIG. 3) is read. In block 144 a check is made to see if the msb equals "1". If the answer is Yes(Y), then in block 146 a check is made to see if the add/subtract bit equals zero but if the answer in block 144 is No(N), then in block 148 a check is made to see if the add/subtract bit equals "1". A No(N) answer from the block 146 and a Yes(Y) answer from the block 148 causes, in block 150, the add/subtract value to be subtracted from the interval value. In block 152, the new value is stored in a RAM and in block 154 the new value is loaded into the interval register. Thereafter the flow chart proceeds to a return block 156.

If the answer from the block 146 is Yes(Y) and the answer from the block 148 is No(N), then in block 158, the add/subtract value is added to the interval value. In block 160, a check is made if the interval value counter has overflowed. If it has not (N), then in block 162 the new value is stored in the RAM. This new value is, in block 164, loaded into the interval register. Thereafter the flow chart proceeds to a return block 166.

If the answer from the block 160 is Yes(Y), then the add/subtract bit is toggled in block 168. The original value is loaded into the interval register, block 170, and the flow chart proceeds to a return block 172.

The described frequency generating circuit may be adapted for use with other known paging systems such as the ETSI Standard known as "ERMES" and the Motorola proprietary Standard known as "FLEX". In particular the capacity of the measurement counter 36 has to be adjusted to suit the respective Standard. With ERMES the time between two synchronisation events will be 1 cycle which is equivalent to 1 minute. At a clock frequency of 76.8 kHz, the number of clock pulses in a cycle will be 4,608,000. Over the period of one cycle an offset of the order of 230 clock pulses could occur. In order to cope with such an offset, at least a 9-bit measurement counter would be required.

In the case of FLEX, a cycle period is 4 minutes and a frame has a duration of 1.875 seconds. If the measurement counter operates over a frame period, a 7-bit measurement counter would be sufficient. However if a 4 minute cycle period was used then at 76.8 kHz there would be 18,432,000 lock pulses. If a deviation of 500 ppm is assumed, an offset of more than 900 clock pulses could occur and in order to cope with such an offset a measurement counter of at least 11 bits will be necessary.

In either case, the measurement times of 1 minute (ERMES) and 4 minutes (FLEX) means that a correction mechanism incrementing/decrementing by 1 pulse will take too long to reach convergence. In order to overcome this problem it would be better to take the actually measured value, rather than the state of the msb or overflow of the measurement counter 36, and determine by software techniques what the interval value should be.

One method of achieving the interval value would be to count the number of clock pulses, which number would exceed $2^{16}$, the capacity of the interval counter 54. At each overflow, an interrupt will be given and by counting the number of overflows, the total number of clock pulses can be determined. This number is compared to a correct value and the difference is transformed into the actual deviation measured in ppm. The actual deviation is used to determine the new interval value for adding or deleting a clock pulse.

From reading the present disclosure, other modifications will be apparent to persons skilled in the art. Such modifications may involve other features which are already known in the design, manufacture and use of receiving apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A receiving apparatus comprising means for receiving a transmitted signal, decoding means for decoding the received signal, means for deriving a repetitive reference signal from the decoded signal, and clock signal generating means for generating a corrected clock signal within a predetermined frequency tolerance range in parts per million, said clock signal generating means comprising means for generating an uncorrected clock frequency signal having a more relaxed frequency tolerance range than said predetermined frequency tolerance range, and means for generating the corrected clock signal from the uncorrected clock frequency signal which comprises:

clock frequency determining means for determining whether the corrected clock signal generated in respective time periods between successive reference signals varies relative to a predetermined value, said clock frequency determining means providing a control signal on an output, and frequency adjustment means responsive to the control signal for adjusting the frequency of the uncorrected clock frequency signal so that the frequency of the corrected clock signal is within the predetermined frequency tolerance range.

2. A receiving apparatus as claimed in claim 1, for use in a system in which synchronization code words are transmitted periodically, wherein the means for deriving a repetitive reference signal is a sync code word detector which produces a timing pulse at the end of a synchronization code word.

3. A receiving apparatus as claimed in claim 2, wherein the means for generating the uncorrected clock frequency signal comprises a crystal oscillator for generating said uncorrected clock frequency signal having a frequency greater than a desired output frequency, a pulse swallow circuit having an input coupled to an output of the crystal oscillator, an output and a control input coupled to an output of an adjustable accumulator, the crystal oscillator output also being applied to the adjustable accumulator.

4. A receiving apparatus as claimed in claim 3, wherein the adjustable accumulator comprises an adjustable modulus counter, the modulus of which is adjustable in response to the control signal from said clock frequency determining means.

5. A receiving apparatus as claimed in claim 3, wherein the clock frequency determining means is a free running counter having an input coupled to an output of the pulse swallow circuit, a reset input coupled to said means for providing a repetitive reference signal, and an output for providing the most significant bit as the control signal.

6. A receiving apparatus as claimed in claim 1, wherein the means for generating the uncorrected clock frequency signal comprises a crystal oscillator including a crystal whose tolerance is more relaxed than the predetermined frequency tolerance range, and the frequency adjustment means comprises pulse addition/elimination means responsive to the uncorrected crystal oscillator frequency being too low for adding at least one pulse to the uncorrected clock frequency signal and for shortening the measurement interval, and responsive to the uncorrected crystal oscillator frequency being too high for deleting at least one pulse from the uncorrected clock frequency signal and for lengthening the measurement interval.

7. A receiving apparatus as claimed in claim 6, further comprising a measurement counter for counting pulses produced by a frequency correction circuit over a period determined by the reference signals, logic means for determining if the frequency of the corrected clock signal is within the predetermined tolerance range by checking the most significant bit of the measurement counter and depending on its value, deciding the nature of the correction to the uncorrected clock frequency signal and the alteration of the measurement interval.

8. A receiving apparatus as claimed in claim 7, wherein said pulse addition/elimination means comprises an interval register for setting the measurement interval under the control of the logic means, and an interval counter having an input coupled to the crystal oscillator, a counting interval of the interval counter being preset by the interval register, said pulse addition/elimination means being coupled to an output Of the interval counter.

9. A receiving apparatus as claimed in claim 8, wherein the logic means in response to detection of a relatively large correction being required to the corrected clock signal, increments/decrements the measurement interval set by the interval register by a value greater than one pulse in order to achieve faster convergence to a corrected clock signal within the predetermined tolerance range.

* * * * *